United States Patent
Yin et al.

(10) Patent No.: US 8,275,040 B2
(45) Date of Patent: Sep. 25, 2012

(54) METHOD AND APPARATUS FOR WEIGHTED PREDICTION FOR SCALABLE VIDEO CODING

(75) Inventors: Peng Yin, West Windsor, NJ (US); Jill MacDonald Boyce, Manalapan, NJ (US); Purvin Bibhas Pandit, Franklin Park, NJ (US)

(73) Assignee: Thomson Licensing, Boulogne-Billancourt (FR)

( * ) Notice: Subject to any disclaimer, the term of this patent is extended or adjusted under 35 U.S.C. 154(b) by 612 days.

(21) Appl. No.: 11/989,175

(22) PCT Filed: May 25, 2006

(86) PCT No.: PCT/US2006/020422
§ 371 (c)(1),
(2), (4) Date: Jan. 22, 2008

(87) PCT Pub. No.: WO2007/018682
PCT Pub. Date: Feb. 15, 2007

(65) Prior Publication Data
US 2010/0215103 A1    Aug. 26, 2010

Related U.S. Application Data

(60) Provisional application No. 60/701,820, filed on Jul. 22, 2005.

(51) Int. Cl.
H04N 7/32    (2006.01)
(52) U.S. Cl. .......... 375/240.16; 375/240.12; 375/240.29
(58) Field of Classification Search ................... 370/240, 370/240.12, 240.16, 240.29
See application file for complete search history.

(56) References Cited

U.S. PATENT DOCUMENTS

2006/0008038 A1*  1/2006  Song et al. ................ 375/350
2007/0014361 A1*  1/2007  Cruz et al. ............ 375/240.16

OTHER PUBLICATIONS

Boyce, "Weighted Prediction in the H.264/MPEG AVC Video Coding Standard," XP010719383, Circuits and Systems, 2004, ISCAS'04, Proceedings of the 2004 Int'l. Symposium on Vancouver, BC, Canada May 23-26.*

Boyce, "Weighted Prediction in the H.264/MPEG AVC Video Coding Standard," XP010719383, Circuits and Systems, 2004, ISCAS'04, Proceedings of the 2004 Int'l. Symposium on Vancouver, BC, Canada May. 23-26, 2004.

JVT, XP002401270, Index of/av-arch/jvt-site/2005_07 Poznan, Sep.27,2006.

Lee, "Extension of weighted prediction to multi layer structure," XP-002401269, JVT-P076, Joint Video Team (JVT) of ISO/IEC MPEG & ITU-TVCEG, 16th Meeting: Poznan, Pol. Jul. 25-29, 2005.

(Continued)

*Primary Examiner* — Hassan Kizou
*Assistant Examiner* — Siming Liu
(74) *Attorney, Agent, or Firm* — Robert D. Shedd; Paul P. Kiel; Guy H. Eriksen (57) ABSTRACT

There are provided scalable video encoders, scalable video decoders, and corresponding methods for scalable video encoding and decoding. A scalable video encoder includes an encoder for encoding a block in a picture by performing a motion compensated temporal filtering (MCTF) prediction step for the block using a first weighting factor applied to a first reference picture, while using a different default update weighting factor applied to a second reference picture for a corresponding MCTF update step for the block.

48 Claims, 4 Drawing Sheets

OTHER PUBLICATIONS

Yin et al, "Weighted Prediction in SVC", XP-002401268, JVT-P064, Joint Video Team (JVT) of ISO/IEC MPEG & ITU-T VCEG, 16th Meeting: Poznan, Poland, Jul. 25-29, 2005.

Schwarz et al, "Further Progress on Scalable Extension of H.264," VCEG-X08, ITU-T Video Coding Experts Group (ITU-T SG16 Q.6), 24th Meeting: Palma de Mallorca, Spain, Oct. 2004.

Schwarz et al., "SNR-scalable Extension of H.264/AVC," JVT-J035, Joint Video Team (JVT) of ISO/IEC MPEG & ITU-T VCEG, 10th Meeting: Waikoloa, Hawaii, USA, Dec. 8-12, 2003.

Yin et al, "Weighted Prediction for SVC MCTF Updated Step," XP-002400836, JVT-P065, Joint Video Team (JVT) of ISO/IEC MPEG & ITU-T VCEG, 16th Meeting: Poznan, Poland, Jul. 25-29, 2005.

Reichel et al, "Scalable Video Coding—Working Draft 2", JVT-O201, Joint Video Team (JVT) of ISO/IEC MPEG & ITU-T VCEG, 15th Meeting: Busan, KR, Apr. 16-22, 2005.

International Search Report, dated.

Peng Yin, et al., "Weighted Prediction in SVC", Joint Video Team (JVT) of ISO/IEC MPEG & ITU-T VCEG, JVT-P0064, Jul. 2005, pp. 1-10, Poland.

\* cited by examiner

METHOD AND APPARATUS FOR WEIGHTED PREDICTION FOR SCALABLE VIDEO CODING

CROSS-REFERENCE TO RELATED APPLICATIONS

This application claims the benefit, under 35 U.S.C. §365 of International Application PCT/US2006/020422, filed May 25, 2006, which was published in accordance with PCT Article 21(2) on Feb. 15, 2007 in English and which claims the benefit of U.S. provisional patent application No. 60/701,820, filed Jul. 22, 2005.

FIELD OF THE INVENTION

The present invention relates generally to video encoding and decoding and, more particularly, to methods and apparatus for weighted prediction for scalable video encoding and decoding.

BACKGROUND OF THE INVENTION

The International Organization for Standardization/International Electrotechnical Commission (ISO/IEC) Moving Picture Experts Group-4 (MPEG-4) Part 10 Advanced Video Coding (AVC) standard/International Telecommunication Union, Telecommunication Sector (ITU-T) H.264 standard (hereinafter the "MPEG4/H.264 standard" or simply the "H.264 standard") is the first international video coding standard to include a Weighted Prediction (WP) tool. The scalable video coding (SVC) standard, which is currently being developed as an amendment of the H.264 standard (and is thus also interchangeably referred to herein as the "H.264 standard"), also adopts weighted prediction. However, the SVC standard does not specify how to handle the weights in motion compensated temporal filtering (MCTF) update step if weighted prediction is used in the prediction step.

Weighted Prediction is supported in the Main, Extended, and High profiles of the H.264 standard. The use of WP is indicated in the sequence parameter set for P and SP slices using the weighted_pred_flag field, and for B slices using the weighting_bipred_idc field. There are two WP modes, an explicit mode and an implicit mode. The explicit mode is supported in P, SP, and B slices. The implicit mode is supported in only B slices.

A single weighting factor and offset are associated with each reference index for each color component in each slice. In explicit mode, these WP parameters may be coded in the slice header. In implicit mode, these WP parameters are derived based only on the relative distance of the current picture and its reference pictures.

For each macroblock or macroblock partition, the weighting parameters applied are based on a reference picture index (or indices in the case of bi-prediction) of the current macroblock or macroblock partition. The reference picture indices are either coded in the bitstream or may be derived, e.g., for skipped or direct mode macroblocks. The use of the reference picture index to signal which weighting parameters to apply is bitrate efficient, as compared to requiring a weighting parameter index in the bitstream, since the reference picture index is already available based on the other required bitstream fields.

Many different methods of scalability have been widely studied and standardized, including SNR scalability, spatial scalability, temporal scalability, and fine grain scalability, in scalability profiles of the MPEG-2 and H.264 standards, or are currently being developed as an amendment of the H.264 standard.

SUMMARY OF THE INVENTION

These and other drawbacks and disadvantages of the prior art are addressed by the present invention, which is directed to methods and apparatus for weighted prediction for scalable video encoding and decoding.

According to an aspect of the present invention, there is provided a scalable video encoder. The scalable video encoder includes an encoder for encoding a block in a picture by performing a motion compensated temporal filtering (MCTF) prediction step for the block using a first weighting factor applied to a first reference picture, while using a different default update weighting factor applied to a second reference picture for a corresponding MCTF update step for the block.

According to another aspect of the present invention, there is provided a scalable video encoder. The scalable video encoder includes an encoder for encoding a block in a picture by performing a motion compensated temporal filtering (MCTF) prediction step for the block using a first weighting factor applied to a first reference picture, while using a default update weighting factor applied to a second reference picture for a corresponding MCTF update step for the block. The default update weighting factor incorporates a weighting factor derived from the first weighting factor applied to the first reference picture for the MCTF prediction step for the block.

According to yet another aspect of the present invention, there is provided a method for scalable video encoding. The method includes encoding a block in a picture by performing a motion compensated temporal filtering (MCTF) prediction step for the block using a first weighting factor applied to a first reference picture, while using a different default update weighting factor applied to a second reference picture for a corresponding MCTF update step for the block.

According to still another aspect of the present invention, there is provided a method for scalable video encoding. The method includes encoding a block in a picture by performing a motion compensated temporal filtering (MCTF) prediction step for the block using a first weighting factor applied to a first reference picture, while using a default update weighting factor applied to a second reference picture for a corresponding MCTF update step for the block. The default update weighting factor incorporates a weighting factor derived from the first weighting factor applied to the first reference picture for the MCTF prediction step for the block.

According to a further aspect of the present invention, there is provided a scalable video decoder. The scalable video decoder includes a decoder for decoding a block in a picture by performing a motion compensated temporal filtering (MCTF) prediction step for the block using a first weighting factor applied to a first reference picture, while using a different default update weighting factor applied to a second reference picture for a corresponding MCTF update step for the block.

According to a still further aspect of the present invention, there is provided a scalable video decoder. The scalable video decoder includes a decoder for decoding a block in a picture by performing a motion compensated temporal filtering (MCTF) prediction step for the block using a first weighting factor applied to a first reference picture, while using a default update weighting factor applied to a second reference picture for a corresponding MCTF update step for the block. The default update weighting factor incorporates a weighting factor derived from the first weighting factor applied to the first reference picture for the MCTF prediction step for the block.

According to an additional aspect of the present invention, there is provided a method for scalable video decoding. The method includes decoding a block in a picture by performing a motion compensated temporal filtering (MCTF) prediction step for the block using a first weighting factor applied to a first reference picture, while using a different default update weighting factor applied to a second reference picture for a corresponding MCTF update step for the block.

According to a further additional aspect of the present invention, there is provided a method for scalable video decoding. The method includes decoding a block in a picture by performing a motion compensated temporal filtering (MCTF) prediction step for the block using a first weighting factor applied to a first reference picture, while using a default update weighting factor applied to a second reference picture for a corresponding MCTF update step for the block. The default update weighting factor incorporates a weighting factor derived from the first weighting factor applied to the first reference picture for the MCTF prediction step for the block.

These and other aspects, features and advantages of the present invention will become apparent from the following detailed description of exemplary embodiments, which is to be read in connection with the accompanying drawings.

BRIEF DESCRIPTION OF THE DRAWINGS

The present invention may be better understood in accordance with the following exemplary figures, in which.

DETAILED DESCRIPTION

The present invention is directed to methods and apparatus for weighted prediction for scalable video encoding and decoding. The present invention may be employed with respect to motion compensated temporal filtering (MCTF), which is based on the concept of lifting schemes, wherein a typical lifting scheme includes a polyphase decomposition step, a prediction step, and an update step.

In accordance with embodiments of the present principles, weights in a MCTF update step are processed when weighted prediction is used in the prediction step. At least two illustrative embodiments are disclosed herein. However, it is to be appreciated that given the teachings of the present principles provided herein, one of ordinary skill in this and related arts will contemplate these and other embodiments and variations of the present principles, while maintaining the scope of the present principles. Joint Scalable Video Model Version 2.0 (hereinafter "JSVM2.0") does not take into account the weights in weighted prediction, even though weighted prediction is in the prediction step. The instant embodiment in accordance with the present principles performs the update step using the default weights in JVSM2.0. The second embodiment applies the derived weights from the prediction step in the update step.

The present description illustrates the principles of the present invention. It will thus be appreciated that those skilled in the art will be able to devise various arrangements that, although not explicitly described or shown herein, embody the principles of the invention and are included within its spirit and scope.

All examples and conditional language recited herein are intended for pedagogical purposes to aid the reader in understanding the principles of the invention and the concepts contributed by the inventor to furthering the art, and are to be construed as being without limitation to such specifically recited examples and conditions.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. It is thus regarded that any means that can provide those functionalities are equivalent to those shown herein.

Figure 1:
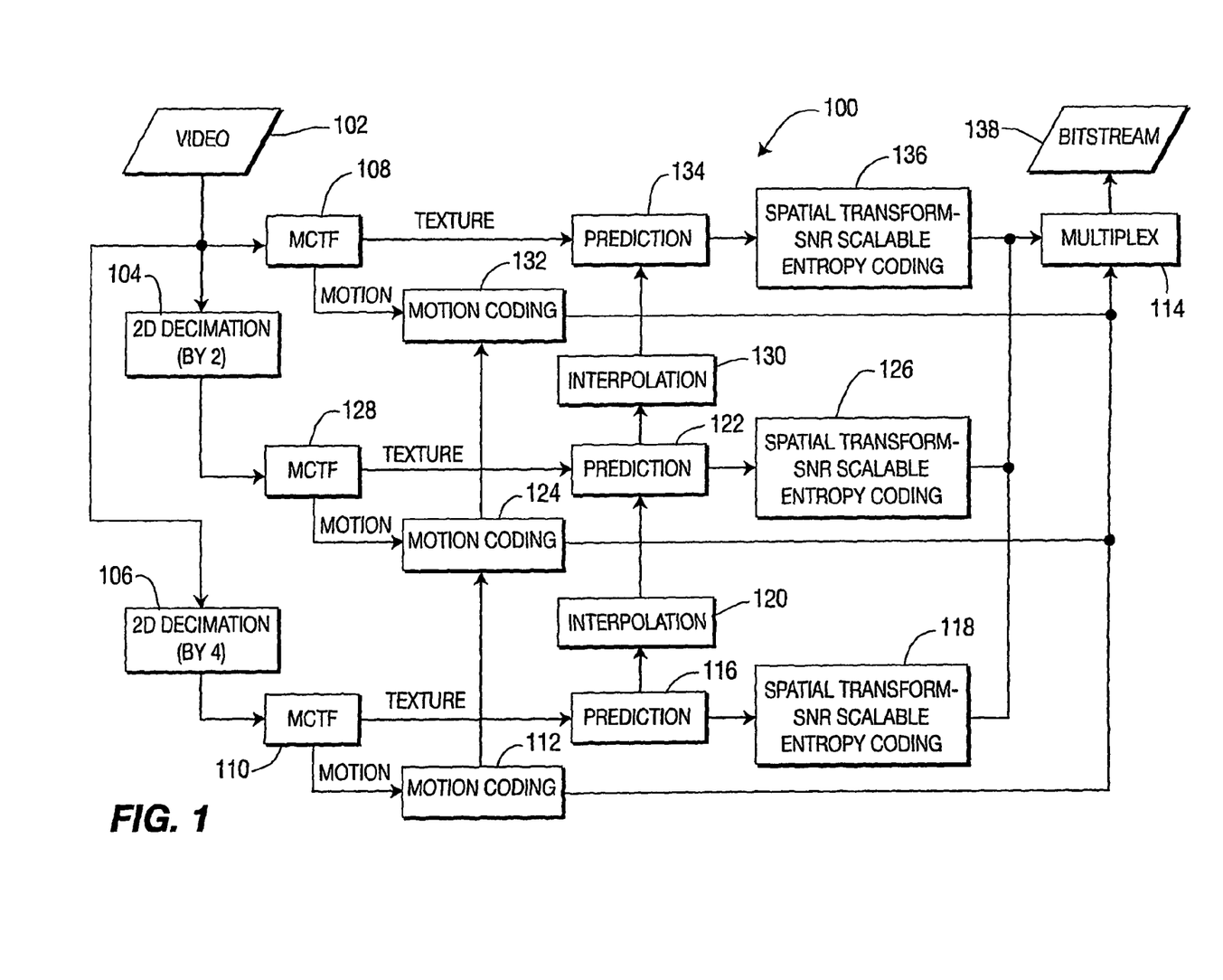
FIG. 1 shows a block diagram for an exemplary Joint Scalable Video Model (JSVM) 2.0 encoder to which the present principles may be applied.

Turning to FIG. 1, an exemplary Joint Scalable Video Model Version 2.0 (hereinafter "JSVM2.0") encoder to which the present invention may be applied is indicated generally by the reference numeral 100. The JSVM2.0 encoder 100 uses three spatial layers and motion compensated temporal filtering. The JSVM encoder 100 includes a two-dimensional (2D) decimator 104, a 2D decimator 106, and a motion compensated temporal filtering (MCTF) module 108, each having an input for receiving video signal data 102.

An output of the 2D decimator 106 is connected in signal communication with an input of a MCTF module 110. A first output of the MCTF module 110 is connected in signal communication with an input of a motion coder 112, and a second output of the MCTF module 110 is connected in signal communication with an input of a prediction module 116. A first output of the motion coder 112 is connected in signal communication with a first input of a multiplexer 114. A second output of the motion coder 112 is connected in signal communication with a first input of a motion coder 124. A first output of the prediction module 116 is connected in signal communication with an input of a spatial transformer 118. An output of the spatial transformer 118 is connected in signal communication with a second input of the multiplexer 114. A second output of the prediction module 116 is connected in signal communication with an input of an interpolator 120. An output of the interpolator is connected in signal communication with a first input of a prediction module 122. A first output of the prediction module 122 is connected in signal communication with an input of a spatial transformer 126. An output of the spatial transformer 126 is connected in signal communication with the second input of the multiplexer 114. A second output of the prediction module 122 is connected in signal communication with an input of an interpolator 130. An output of the interpolator 130 is connected in signal communication with a first input of a prediction module 134. An output of the prediction module 134 is connected in signal communication with a spatial transformer 136. An output of the spatial transformer is connected in signal communication with the second input of a multiplexer 114.

An output of the 2D decimator 104 is connected in signal communication with an input of a MCTF module 128. A first output of the MCTF module 128 is connected in signal communication with a second input of the motion coder 124. A first output of the motion coder 124 is connected in signal communication with the first input of the multiplexer 114. A second output of the motion coder 124 is connected in signal communication with a first input of a motion coder 132. A second output of the MCTF module 128 is connected in signal communication with a second input of the prediction module 122.

A first output of the MCTF module 108 is connected in signal communication with a second input of the motion coder 132. An output of the motion coder 132 is connected in signal communication with the first input of the multiplexer 114. A second output of the MCTF module 108 is connected in signal communication with a second input of the prediction module 134. An output of the multiplexer 114 provides an output bitstream 138.

For each spatial layer, a motion compensated temporal decomposition is performed. This decomposition provides temporal scalability. Motion information from lower spatial layers can be used for prediction of motion on the higher layers. For texture encoding, spatial prediction between successive spatial layers can be applied to remove redundancy.

The residual signal resulting from intra prediction or motion compensated inter prediction is transform coded. A quality base layer residual provides minimum reconstruction quality at each spatial layer. This quality base layer can be encoded into an H.264 standard compliant stream if no inter-layer prediction is applied. For quality scalability, quality enhancement layers are additionally encoded. These enhancement layers can be chosen to either provide coarse or fine grain quality (SNR) scalability.

Figure 2:
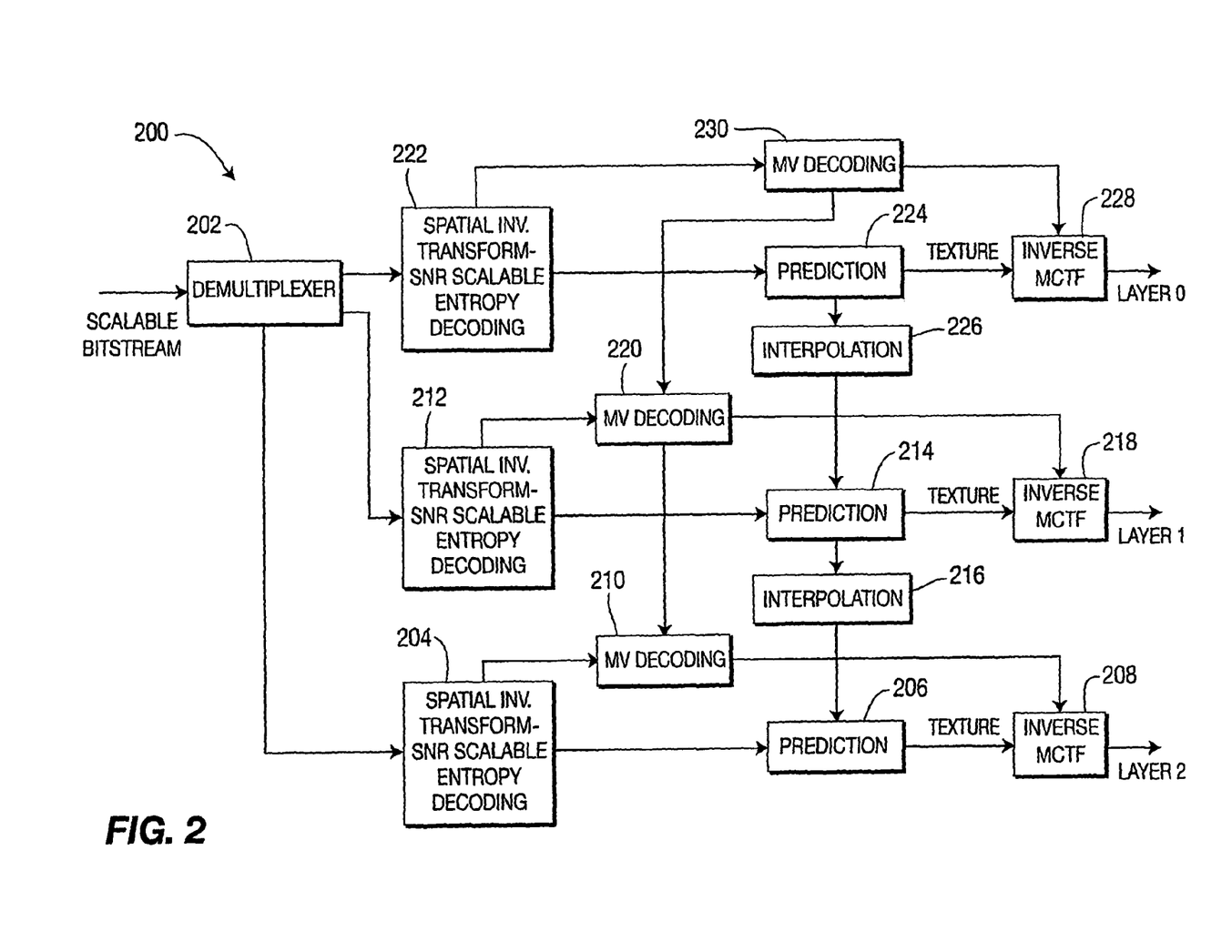
FIG. 2 shows a block diagram for an exemplary video decoder to which the present principles may be applied.

Turning to FIG. 2, an exemplary scalable video decoder to which the present invention may be applied is indicated generally by the reference numeral 200. An Input of a demultiplexer 202 is available as an input to the scalable video decoder 200, for receiving a scalable bitstream. A first output of the demultiplexer 202 is connected in signal communication with an input of a spatial inverse transform SNR scalable entropy decoder 204. A first output of the spatial inverse transform SNR scalable entropy decoder 204 is connected in signal communication with a first input of a prediction module 206. An output of the prediction module 206 is connected in signal communication with a first input of an inverse MCTF module 208.

A second output of the spatial inverse transform SNR scalable entropy decoder 204 is connected in signal communication with a first input of a motion vector (MV) decoder 210. An output of the MV decoder 210 is connected in signal communication with a second input of the inverse MCTF module 208.

A second output of the demultiplexer 202 is connected in signal communication with an input of a spatial inverse transform SNR scalable entropy decoder 212. A first output of the spatial inverse transform SNR scalable entropy decoder 212 is connected in signal communication with a first input of a prediction module 214. A first output of the prediction module 214 is connected in signal communication with an input of an interpolation module 216. An output of the interpolation module 216 is connected in signal communication with a second input of the prediction module 206. A second output of the prediction module 214 is connected in signal communication with a first input of an inverse MCTF module 218.

A second output of the spatial inverse transform SNR scalable entropy decoder 212 is connected in signal communication with a first input of an MV decoder 220. A first output of the MV decoder 220 is connected in signal communication with a second input of the MV decoder 210. A second output of the MV decoder 220 is connected in signal communication with a second input of the inverse MCTF module 218.

A third output of the demultiplexer 202 is connected in signal communication with an input of a spatial inverse transform SNR scalable entropy decoder 222. A first output of the spatial inverse transform SNR scalable entropy decoder 222 is connected in signal communication with an input of a prediction module 224. A first output of the prediction module 224 is connected in signal communication with an input of an interpolation module 226. An output of the interpolation module 226 is connected in signal communication with a second input of the prediction module 214.

A second output of the prediction module 224 is connected in signal communication with a first input of an inverse MCTF module 228. A second output of the spatial inverse transform SNR scalable entropy decoder 222 is connected in signal communication with an input of an MV decoder 230. A first output of the MV decoder 230 is connected in signal communication with a second input of the MV decoder 220. A second output of the MV decoder 230 is connected in signal communication with a second input of the inverse MCTF module 228.

An output of the inverse MCTF module 228 is available as an output of the decoder 200, for outputting a layer 0 signal. An output of the inverse MCTF module 218 is available as an output of the decoder 200, for outputting a layer 1 signal. An output of the inverse MCTF module 208 is available as an output of the decoder 200, for outputting a layer 2 signal.

Motion compensated temporal filtering (MCTF) is based on the concept of lifting schemes. A typical lifting scheme is comprised of three steps, the polyphase decomposition step, the prediction step, and the update step.

Figure 3:
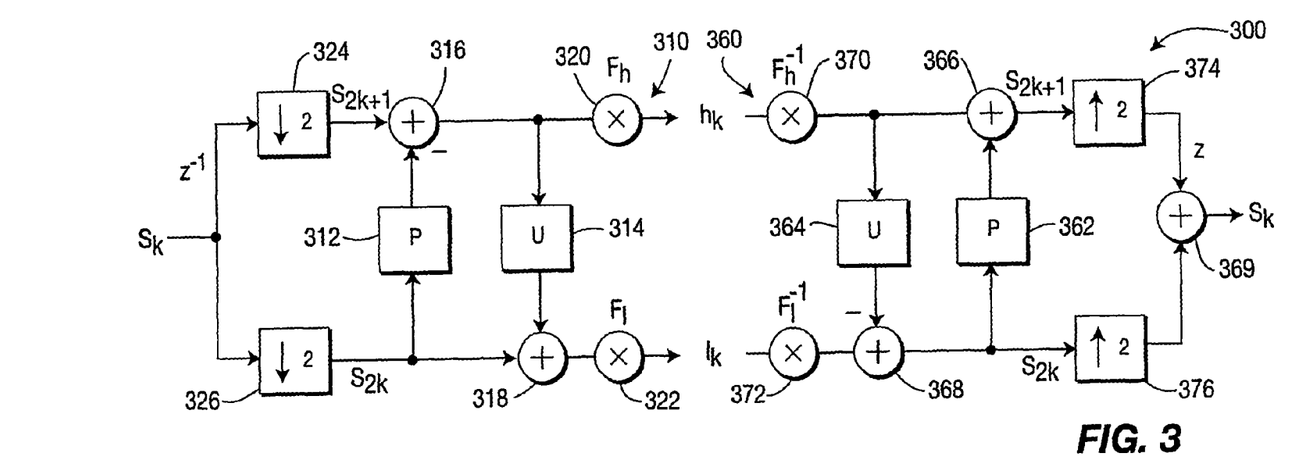
FIG. 3 is a diagram illustrating a lifting representation of an analysis-synthesis filter bank to which the present principles may be applied.

Turning to FIG. 3, a lifting representation of an analysis-synthesis filter bank is indicated by the reference numeral 300. The analysis-synthesis filter bank 300 includes a lifting scheme/analysis filterbank 310 (on the left side of FIG. 3) and an inverse lifting scheme/synthesis filterbank 360 (on the right side of FIG. 3). The lifting scheme/analysis filterbank 310 includes a prediction operator 312, an update operator 314, a first combiner 316, a second combiner 318, a first mixer 320, a second mixer 322, a down sampler (by 2) 324, and an up sampler (by 2) 326. The inverse lifting scheme/synthesis filterbank 360 includes a prediction operator 362, an update operator 364, a first combiner 366, a second combiner 368, a third combiner 369, a first mixer 370, a second mixer 372, a first up sampler 374, and a second up sampler 376.

The polyphase decomposition step separates the even and the odd samples of a given signal s[k]. We define $s_{odd}[k]=s[2k+1]$ and $s_{even}[k]=s[2k]$.

In the analysis filterbank 310, the odd samples s[2k+1] of a given signal s are predicted by a linear combination of the even samples s[2k] using a prediction operator P(s[2k]) and a high pass signal h[k] is formed by the prediction residuals. A corresponding low-pass signal l[k] is obtained by combining a linear combination of the prediction residuals h[k] to the even samples s[2k] of the input signal s using the update operator U(h[k]):

$$h[k] = s[2k+1] - P(s[2k])$$

with $$P(s[2k]) = \sum_i p_i s[2(k+i)]$$

$$l[k] = s[2k] + U(h[k])$$

with $$U(h[k]) = \sum_i u_i h[k+i]$$

For a Haar wavelet, we have the following:

$$h[k] = s[2k+1] - s[2k] \quad (1)$$

and $$l[k] = s[2k] + \frac{1}{2}h[k] = \frac{1}{2}(s[2k] + s[2k+1]) \quad (2)$$

For 5/3 bi-orthogonal spline wavelet, we have the following:

$$h[k] = s[2k+1] - \frac{1}{2}(s[2k] + s[2k+2]) \quad (3)$$

and $$l[k] = s[2k] + \frac{1}{4}(h[k] + h[k-1]) = \quad (4)$$
$$\frac{3}{4}s[2k] + \frac{1}{4}(s[2k+1] + s[2k-1]) - \frac{1}{8}(s[2k+2] + s[2k-2])$$

In JSVM2.0, we can perform MCTF with or without the update step. The update indication is based on the syntax num_ref_idx_update_IX_active[i] in the slice header. The syntax num_ref_idx_update_IX_active[i] specifies the maximum reference index for update picture listX that shall be used for an update process that uses pictures for which temporal_level is equal to i.

Thus, num_ref_idx_update_IX_active[i]==0 indicates no update step is performed for listX with temporal level equal to i. JSVM2.0 does not transmit any explicit data for the update step. The information related to the update step has to be derived at both the encoder and decoder.

In JSVM2.0, when the update step is enabled, in order to avoid coding artifacts for subjective quality, adaptive update weights are applied to control the update strength. For each 4×4 luminance block B, the generation of the update picture U({h[x, k]}) is adaptively controlled by the update weights $w_{U0}$ and $w_{U1}$. Thus, the update signal u[x, k] is obtained as follows:

$$u[x,k]=((w_{U0} \cdot h[x+m_{U0}(x),k+r_{U0}(x)]/128)+(w_{U1} \cdot h[x+m_{U1}(x),k-r_{U1}(x)-1]/128)+1)>>1 \quad (5)$$

where h[x, k] is high-pass signal with the spatial coordinate $x=(x, y)^T$ and the temporal coordinate k, $m_{U1}$ is the update motion vector, and $r_{U1}$ represents the reference picture indices.

The update weights $w_{U1}$ are given as follows, $$w_{U1}=\max(0,\min(8,N_i-8)) \cdot \max(0,\min(16,20-E_i)) \quad (6)$$

where $N_i$ is the number of connected samples and $E_i$ represents an energy measure for the motion-compensated block of the corresponding high-pass signal:

$$E_0 = \left(128 + \sum_{x \in B} (h[x+m_{U0}(x), k+r_{U0}(x)])^2\right) / 256, \quad (7)$$

$$E_1 = \left(128 + \sum_{x \in B} (h[x+m_{U1}(x), k-r_{U1}(x)-1])^2\right) / 256.$$

Although JSVM2.0 specifies how to perform the update step with adaptive update weights when WP is not used, it does not make a decision on what weights should be used for the update step when WP is used.

As previously stated and in accordance with the present principles, two illustrative embodiments are described herein for processing the weights in a MCTF update step when weighted prediction is used in a MCTF prediction step. The first embodiment involves performing the update step using default update weights in JSVM2.0, as shown in equations (5) (6) (7). As stated above, JSVM2.0 does not take into account the weights in weighted prediction, even though weighted prediction is in the prediction step. The advantage of this embodiment is to unify the update step for both cases: WP in the MCTF prediction step; or no WP in the MCTF prediction step. Since JSVM2.0 does not transmit any explicit data for the update step, the information related to the update step has to be derived at both the encoder and decoder. It is to be appreciated that the first embodiment can advantageously simplify the complexity at both decoder and encoder.

The second embodiment involves applying weighted prediction to the update step using derived weights from the prediction step. The complexity of the second embodiment tends to be greater than that of the first embodiment. The video encoder and/or decoder can be forced to use one of the embodiments under a profile constraint or a level constraint, or can make the decision to switch from the two embodiments with one syntax, namely update_wp_flag, added in slice header.

update_wp_flag equal to 0 specifies that the update step does not incorporate the derived weights from the prediction step. update_wp_flag equal to 1 specifies that the update step incorporates the derived weights from the prediction step.

For the second embodiment, the weights applied in the update step can be derived as follows.

The Weighted Prediction tool in the H.264 standard can be simply written as s=wr+o, where s is the video signal, r is the reference signal, w is the weighting factor, and o is the weighting offset.

When weighted prediction is used in the prediction step, assuming r(s[2k+1])=ws[2k]+o, so for the Haar wavelet, we have the following:

$$h[k] = s[2k+1] - (ws[2k] + o) \quad (8)$$

and $$\begin{aligned} l[k] &= \frac{1}{2}(s[2k] + (s[2k+1] - o)/w) \\ &= \frac{1}{2}(s[2k] + (h[k] + (ws[2k] + o) - o)/w) \\ &= \frac{1}{2}(2s[2k] + h[k]/w) \\ &= s[2k] + \frac{1}{2}\frac{h[k]}{w} \end{aligned} \quad (9)$$

From equation (9), we can see that the corresponding weight in the update step is the inverse weighting factor of the prediction step.

Similarly, if we assume $$\begin{aligned} r(s[2k+1]) &= w_0 s[2k] + o_0, \\ r(s[2k+1]) &= w_1 s[2k+1] + o_1 \end{aligned} \quad (10)$$

and $$\begin{aligned} r(s[2k-1]) &= w_2 s[2k-2] + o_2, \\ r(s[2k-1]) &= w_3 s[2k] + o_3 \end{aligned}$$

and plug them into equation (3) and (4), we shall have $$l[k] = s[2k] + \frac{1}{4}(h[k]/w_0 + h[k-1]/w_3)$$

Equation (10) implies that, similarly to (9), the weights in the update step are the inverse weighting factors of the prediction step associated with s[2k].

In conclusion, in an embodiment, the weights in the update step are the inverse weighting factors of the prediction step associated with s[2k]. The offset is 0. For the adaptive update step, the derived weighting factor should be incorporated into equation (5) (6) and (7), i.e., to replace h[x,k] with h[x,k]/w.

Since JSVM2.0 does not transmit any explicit data for the update step, the information related to the update step has to be derived at both the encoder and decoder.

Since MCTF with an update can also be applied to non-scalable video coding, given the teachings of the present principles provided herein, it is to be appreciated that the invention can also be applied to a non-scalable video coding scheme, while maintaining the scope of the present invention.

It is to be appreciated that the encoding/decoding of a block in a picture in accordance with the present principles may be implemented using the first embodiment (wherein the update step uses default update weights) and/or the second embodiment (wherein weighted prediction is applied to the update step using derived weights from the prediction step). For example, both may be used, with the best selected amongst the two. Accordingly, the term "concurrently" as used herein with respect to encoding a block in a picture, refers to the case where both the first and the second embodiments are employed together, although not necessarily at the exact same time. This is in contrast to the "alternative" use of the first or the second embodiment, where only one of the embodiments is employed to encode the block.

Figure 4:
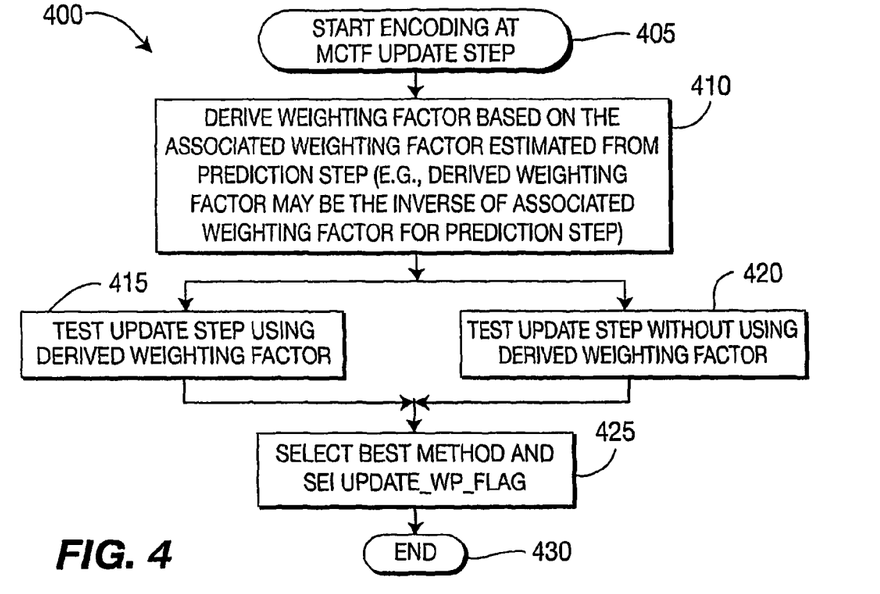
FIG. 4 is a flow diagram for an exemplary method for scalable video encoding, according to an embodiment of the present principles.

Turning to FIG. 4, a method for scalable video encoding is indicated generally by the reference numeral 400. A start block 405 starts encoding at a MCTF update step, and passes control to a function block 410. The function block 410 derives a weighting factor based on the associated weighting factor estimated from the prediction step, and passes control to a function step 415 and a function step 420. The function block 415 tests the update step using the derived weighting factor, and passes control to a function block 425. The function block 420 tests the update step without using the derived weighting factor, and passed control to the function block 425. The function block 425 selects the best method and sets the update_wp_flag, and passes control to an end block 430.

Figure 5:
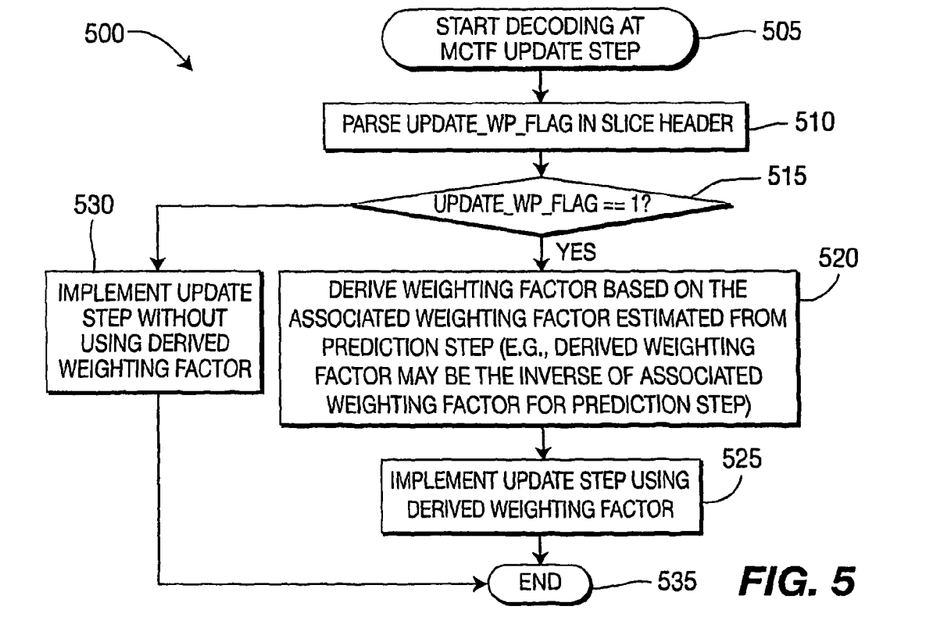
FIG. 5 is a flow diagram for an exemplary method for scalable video decoding, according to an embodiment of the present principles.

Turning to FIG. 5, a method for scalable video decoding is indicated generally by the reference numeral 500. A start block 505 starts decoding at a MCTF update step, and passes control to a function block 510. The function block 510 parses the update_wp_flag in the slice header, and passes control to a decision block 515. The decision block 515 determines whether or not the update_wp_flag is equal to one. If so, then control is passed to a function block 520. Otherwise, control is passed to a function block 530.

The function block 520 derives the weighting factor based on the associated weighting factor estimated from the prediction step, and passes control to a function block 525. The function block 525 implements the update step using the derived weighting factor, and passes control to an end block 535.

The function block 530 implements the update step without using the derived weighting factor, and passes control to the end block 535.

Figure 6:
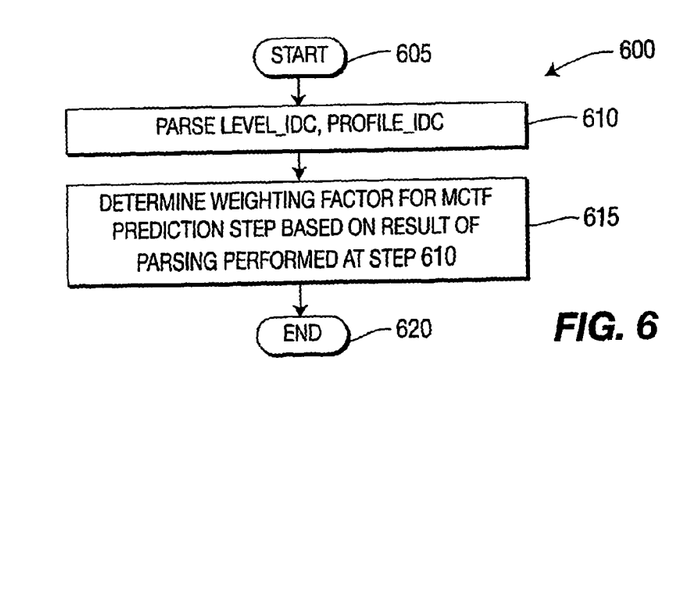
FIG. 6 is a flow diagram for an exemplary method for decoding level_idc and profile_idc syntaxes for a Motion Compensated Temporal Filtering (MCTF) prediction step, according to an embodiment of the present principles.

Turning to FIG. 6, an exemplary method for decoding level_idc and profile_idc syntaxes for a Motion Compensated Temporal Filtering (MCTF) step is indicated generally by the reference numeral 600.

A start block 605 passes control to a function block 610. The function block 610 parses level_idc and profile_idc syntaxes, and passes control to a function block 615. The function block 615 determines a weighting factor for the MCTF prediction step based on the parsing performed by function block 610, and passes control to an end block 620.

A description will now be given of some of the many attendant advantages/features of the present invention, some of which have been mentioned above. For example, one advantage/feature is a scalable video encoder that includes an encoder for encoding a block in a picture by performing a motion compensated temporal filtering (MCTF) prediction step for the block using a first weighting factor applied to a first reference picture, while using a different default update weighting factor applied to a second reference picture for a corresponding MCTF update step for the block. Moreover, another advantage/feature is the scalable video encoder as described above, wherein the encoder performs the MCTF prediction step for the block using the first weighting factor applied to the first reference picture while using the different default update weighting factor applied to the second reference picture for the corresponding MCTF update step for the block, in response to one of a profile constraint or a level constraint. Further, another advantage/feature is the scalable video encoder as described above, wherein the encoder alternatively or concurrently encodes the block in the picture by performing the MCTF prediction step for the block using the first weighting factor applied to the first reference picture, while using a default update weighting factor applied to the second reference picture for the corresponding MCTF update step for the block. The default update weighting factor incorporates a weighting factor derived from the first weighting factor applied to the first reference picture for the MCTF prediction step for the block. Also, another advantage/feature is the scalable video encoder that uses the default update weighting factor that incorporates the derived weighting factor from the MCTF prediction step as described above, wherein the encoder adds a syntax field in a slice header to indicate whether the corresponding MCTF update step is performed using the different default update weighting factor or using the default update weighting factor that incorporates the derived weighting factor from the MCTF prediction step. Moreover, another advantage/feature is the scalable video encoder that uses the default update weighting factor that incorporates the derived weighting factor from the MCTF prediction step and that adds the syntax field in the slice header as described above, wherein the syntax field is an update_wp_flag syntax field. Additionally, another advantage/feature is the scalable video encoder that uses the default update weighting factor that incorporates the derived weighting factor from the MCTF prediction step as described above, wherein the encoder selects whether to perform the corresponding MCTF update step using the different default update weighting factor or using the default update weighting factor that incorporates the derived weighting factor from the MCTF prediction step, based on a best tested coding performance corresponding thereto. Moreover, another advantage/feature is the scalable video encoder that uses the default update weighting factor that incorporates the derived weighting factor from the MCTF prediction step as described above, wherein the derived weighting factor is an inverse of the first weighting factor, and a corresponding derived weighting offset is equal to 0. Also, another advantage/feature is the scalable video encoder as described above, wherein the encoder is capable of performing non-scalable video encoding. Further, another advantage/feature is a scalable video encoder that includes an encoder for encoding a block in a picture by performing a motion compensated temporal filtering (MCTF) prediction step for the block using a first weighting factor applied to a first reference picture, while using a default update weighting factor applied to a second reference picture for a corresponding MCTF update step for the block. The default update weighting factor incorporates a weighting factor derived from the first weighting factor applied to the first reference picture for the MCTF prediction step for the block. Moreover, another advantage/feature is the scalable video encoder as described above, wherein the encoder performs the corresponding MCTF update step to incorporate the derived weighting factor from the MCTF prediction step into the default update weighting factor in response to one of a profile constraint or a level constraint. Additionally, another advantage/feature is the scalable video encoder as described above, wherein the encoder adds a syntax field in a slice header to indicate whether the corresponding MCTF update step is performed using the default update weighting factor that incorporates the derived weighting factor from the MCTF prediction step. Also, another advantage/feature is the scalable video encoder that adds the syntax field in the slice header as described above, wherein the syntax field is an update_wp_flag syntax field. Moreover, another advantage/feature is the scalable video encoder as described above, wherein the derived weighting factor is an inverse of the first weighting factor, and a corresponding derived weighting offset is equal to 0. Further, another advantage/feature is the scalable video encoder as described above, wherein the encoder is capable of performing non-scalable video encoding.

These and other features and advantages of the present invention may be readily ascertained by one of ordinary skill in the pertinent art based on the teachings herein. It is to be understood that the teachings of the present invention may be implemented in various forms of hardware, software, firmware, special purpose processors, or combinations thereof.

Most preferably, the teachings of the present invention are implemented as a combination of hardware and software. Moreover, the software may be implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present invention is programmed. Given the teachings herein, one of ordinary skill in the pertinent art will be able to contemplate these and similar implementations or configurations of the present invention.

Although the illustrative embodiments have been described herein with reference to the accompanying drawings, it is to be understood that the present invention is not limited to those precise embodiments, and that various changes and modifications may be effected therein by one of ordinary skill in the pertinent art without departing from the scope or spirit of the present invention. All such changes and modifications are intended to be included within the scope of the present invention as set forth in the appended claims.

The invention claimed is:

1. An apparatus comprising:
   an encoder for encoding a block in a picture by performing a motion compensated temporal filtering (MCTF) prediction step for the block using a first weighting factor applied to a first reference picture, while using a different default update weighting factor applied to a second reference picture for a corresponding MCTF update step for the block, wherein said encoder selectively encodes the block in the picture by alternatively or concurrently performing the MCTF prediction step for the block using the first weighting factor applied to the first reference picture, while using a default update weighting factor applied to the second reference picture for the corresponding MCTF update step for the block, wherein the default update weighting factor incorporates a weighting factor derived from the first weighting factor applied to the first reference picture for the MCTF prediction step for the block.

2. The apparatus of claim 1, wherein said encoder performs the MCTF prediction step for the block using the first weighting factor applied to the first reference picture while using the different default update weighting factor applied to the second reference picture for the corresponding MCTF update step for the block, in response to one of a profile constraint or a level constraint.

3. The apparatus of claim 1, wherein said encoder adds a syntax field in a slice header to indicate whether the corresponding MCTF update step is performed using the different default update weighting factor or using the default update weighting factor that incorporates the derived weighting factor from the MCTF prediction step.

4. The apparatus of claim 3, wherein the syntax field is an update_wp_flag syntax field.

5. The apparatus of claim 1, wherein said encoder selects whether to perform the corresponding MCTF update step using the different default update weighting factor or using the default update weighting factor that incorporates the derived weighting factor from the MCTF prediction step, based on a best tested coding performance corresponding thereto.

6. The apparatus of claim 1, wherein the derived weighting factor is an inverse of the first weighting factor, and a corresponding derived weighting offset is equal to 0.

7. The apparatus of claim 1, wherein said encoder is capable of performing non-scalable video encoding.

8. An apparatus comprising:
an encoder for encoding a block in a picture by performing a motion compensated temporal filtering (MCTF) prediction step for the block using a first weighting factor applied to a first reference picture, while using a default update weighting factor applied to a second reference picture for a corresponding MCTF update step for the block, wherein the default update weighting factor incorporates a weighting factor derived from the first weighting factor applied to the first reference picture for the MCTF prediction step for the block.

9. The apparatus of claim 8, wherein said encoder performs the corresponding MCTF update step to incorporate the derived weighting factor from the MCTF prediction step into the default update weighting factor in response to one of a profile constraint or a level constraint.

10. The apparatus of claim 8, wherein said encoder adds a syntax field in a slice header to indicate whether the corresponding MCTF update step is performed using the default update weighting factor that incorporates the derived weighting factor from the MCTF prediction step.

11. The apparatus of claim 10, wherein the syntax field is an update_wp_flag syntax field.

12. The apparatus of claim 8, wherein the derived weighting factor is an inverse of the first weighting factor, and a corresponding derived weighting offset is equal to 0.

13. The apparatus of claim 8, wherein said encoder is capable of performing non-scalable video encoding.

14. A method for scalable video encoding, comprising:
encoding a block in a picture by performing a motion compensated temporal filtering (MCTF) prediction step for the block using a first weighting factor applied to a first reference picture, while using a different default update weighting factor applied to a second reference picture for a corresponding MCTF update step for the block,
further comprising selectively encoding the block in the picture by alternatively or concurrently performing the MCTF prediction step for the block using the first weighting factor applied to the first reference picture, while using a default update weighting factor applied to the second reference picture for the corresponding MCTF update step for the block, wherein the default update weighting factor incorporates a weighting factor derived from the first weighting factor applied to the first reference picture for the MCTF prediction step for the block.

15. The method of claim 14, wherein said encoding step performs the MCTF prediction step for the block using the first weighting factor applied to the first reference picture while using the different default update weighting factor applied to the second reference picture for the corresponding MCTF update step for the block, in response to one of a profile constraint or a level constraint.

16. The method of claim 14, further comprising adding a syntax field in a slice header to indicate whether the corresponding MCTF update step is performed using the different default update weighting factor or using the default update weighting factor that incorporates the derived weighting factor from the MCTF prediction step.

17. The method of claim 16, wherein the syntax field is an update_wp_flag syntax field.

18. The method of claim 14, further comprising selecting whether to perform the corresponding MCTF update step using the different default update weighting factor or using the default update weighting factor that incorporates the derived weighting factor from the MCTF prediction step, based on a best tested coding performance corresponding thereto.

19. The method of claim 14, wherein the derived weighting factor is an inverse of the first weighting factor, and a corresponding derived weighting offset is equal to 0.

20. A method for scalable video encoding, comprising:
encoding a block in a picture by performing a motion compensated temporal filtering (MCTF) prediction step for the block using a first weighting factor applied to a first reference picture, while using a default update weighting factor applied to a second reference picture for a corresponding MCTF update step for the block, wherein the default update weighting factor incorporates a weighting factor derived from the first weighting factor applied to the first reference picture for the MCTF prediction step for the block.

21. The method of claim 20, wherein said encoding step performs the corresponding MCTF update step to incorporate the derived weighting factor from the MCTF prediction step into the default update weighting factor, in response to one of a profile constraint or a level constraint.

22. The method of claim 20, further comprising adding a syntax field in a slice header to indicate whether the corresponding MCTF update step is performed using the default update weighting factor that incorporates the derived weighting factor from the MCTF prediction step.

23. The method of claim 22, wherein the syntax field is an update_wp_flag syntax field.

24. The method of claim 20, wherein the derived weighting factor is an inverse of the first weighting factor, and a corresponding derived weighting offset is equal to 0.

25. An apparatus comprising:
a decoder for decoding a block in a picture by performing a motion compensated temporal filtering (MCTF) prediction step for the block using a first weighting factor applied to a first reference picture, while using a different default update weighting factor applied to a second reference picture for a corresponding MCTF update step for the block,
wherein said decoder selectively decodes the block in the picture by alternatively performing the MCTF prediction step for the block using the first weighting factor applied to the first reference picture, while using a default update weighting factor applied to the second reference picture for the corresponding MCTF update step for the block, wherein the default update weighting factor incorporates a weighting factor derived from the first weighting factor applied to the first reference picture for the MCTF prediction step for the block.

26. The apparatus of claim 25, wherein said decoder performs the MCTF prediction step for the block using the first weighting factor applied to the first reference picture while using the different default update weighting factor applied to the second reference picture for the corresponding MCTF update step for the block, in response to one of a profile constraint or a level constraint.

27. The apparatus of claim 25, wherein said decoder evaluates a syntax field in a slice header to determine whether the corresponding MCTF update step is performed using the different default update weighting factor or using the default update weighting factor that incorporates the derived weighting factor from the MCTF prediction step.

28. The apparatus of claim 27, wherein the syntax field is an update_wp_flag syntax field.

29. The apparatus of claim 25, wherein the derived weighting factor is an inverse of the first weighting factor, and a corresponding derived weighting offset is equal to 0.

30. The apparatus of claim 25, wherein said decoder is capable of performing non-scalable video decoding.

31. An apparatus, comprising:
a decoder for decoding a block in a picture by performing a motion compensated temporal filtering (MCTF) prediction step for the block using a first weighting factor applied to a first reference picture, while using a default update weighting factor applied to a second reference picture for a corresponding MCTF update step for the block, wherein the default update weighting factor incorporates a weighting factor derived from the first weighting factor applied to the first reference picture for the MCTF prediction step for the block.

32. The apparatus of claim 31, wherein said decoder performs the corresponding MCTF update step to incorporate the derived weighting factor from the MCTF prediction step into the default update weighting factor in response to one of a profile constraint or a level constraint.

33. The apparatus of claim 31, wherein said decoder evaluates a syntax field in a slice header to determine whether the corresponding MCTF update step is performed using the default update weighting factor that incorporates the derived weighting factor from the MCTF prediction step.

34. The apparatus of claim 33, wherein the syntax field is an update_wp_flag syntax field.

35. The apparatus of claim 31, wherein the derived weighting factor is an inverse of the first weighting factor, and a corresponding derived weighting offset is equal to 0.

36. The apparatus of claim 31, wherein said decoder is capable of performing non-scalable video decoding.

37. A method for scalable video decoding, comprising:
decoding a block in a picture by performing a motion compensated temporal filtering (MCTF) prediction step for the block using a first weighting factor applied to a first reference picture, while using a different default update weighting factor applied to a second reference picture for a corresponding MCTF update step for the block, block,
further comprising selectively decoding the block in the picture by alternatively performing the MCTF prediction step for the block using the first weighting factor applied to the first reference picture, while using a default update weighting factor applied to the second reference picture for the corresponding MCTF update step for the block, wherein the default update weighting factor incorporates a weighting factor derived from the first weighting factor applied to the first reference picture for the MCTF prediction step for the block.

38. The method of claim 37, wherein said decoding step performs the MCTF prediction step for the block using the first weighting factor applied to the first reference picture while using the different default update weighting factor applied to the second reference picture for the corresponding MCTF update step for the block, in response to one of a profile constraint or a level constraint.

39. The method of claim 37, further comprising evaluating a syntax field in a slice header to determine whether the corresponding MCTF update step is performed using the different default update weighting factor or using the default update weighting factor that incorporates the derived weighting factor from the MCTF prediction step.

40. The method of claim 39, wherein the syntax field is an update_wp_flag syntax field.

41. The method of claim 37, wherein the derived weighting factor is an inverse of the first weighting factor, and a corresponding derived weighting offset is equal to 0.

42. A method for scalable video decoding, comprising:
Decoding a block in a picture by performing a motion compensated temporal filtering (MCTF) prediction step for the block using a first weighting factor applied to a first reference picture, while using a default update weighting factor applied to a second reference picture for a corresponding MCTF update step for the block, wherein the default update weighting factor incorporates a weighting factor derived from the first weighting factor applied to the first reference picture for the MCTF prediction step for the block.

43. The method of claim 42, wherein said decoding step performs the corresponding MCTF update step to incorporate the derived weighting factor from the MCTF prediction step into the default update weighting factor, in response to one of a profile constraint or a level constraint.

44. The method of claim 42, further comprising evaluating a syntax field in a slice header to determine whether the corresponding MCTF update step is performed using the default update weighting factor that incorporates the derived weighting factor from the MCTF prediction step.

45. The method of claim 44, wherein the syntax field is an update_wp_flag syntax field.

46. The method of claim 42, wherein the derived weighting factor is an inverse of the first weighting factor, and a corresponding derived weighting offset is equal to 0.

47. A non-transitory computer readable storage media having scalable video signal data encoded thereupon comprising a block encoded in a picture having been performed through a motion compensated temporal filtering (MCTF) prediction step for the block using a first weighting factor applied to a first reference picture, while using a different default update weighting factor applied to a second reference picture for a corresponding MCTF update step for the block,
    wherein the block in the picture is alternatively or concurrently encoded by performing the MCTF prediction step for the block using the first weighting factor applied to the first reference picture, while using a default update weighting factor applied to the second reference picture for the corresponding MCTF update step for the block, wherein the default update weighting factor incorporates a weighting factor derived from the first weighting factor applied to the first reference picture for the MCTF prediction step for the block.

48. A non-transitory computer readable storage media having scalable video signal data encoded thereupon comprising a block encoded in a picture having been performed through a motion compensated temporal filtering (MCTF) prediction step for the block using a first weighting factor applied to a first reference picture, while using a default update weighting factor applied to a second reference picture for a corresponding MCTF update step for the block, wherein the default update weighting factor incorporates a weighting factor derived from the first weighting factor applied to the first reference picture for the MCTF prediction step for the block.

* * * * *